J. G. CARBAUGH & R. G. HYNICKA.
RADIUS ROD SUPPORTER.
APPLICATION FILED JAN. 3, 1916.
1,199,528.
Patented Sept. 26, 1916.
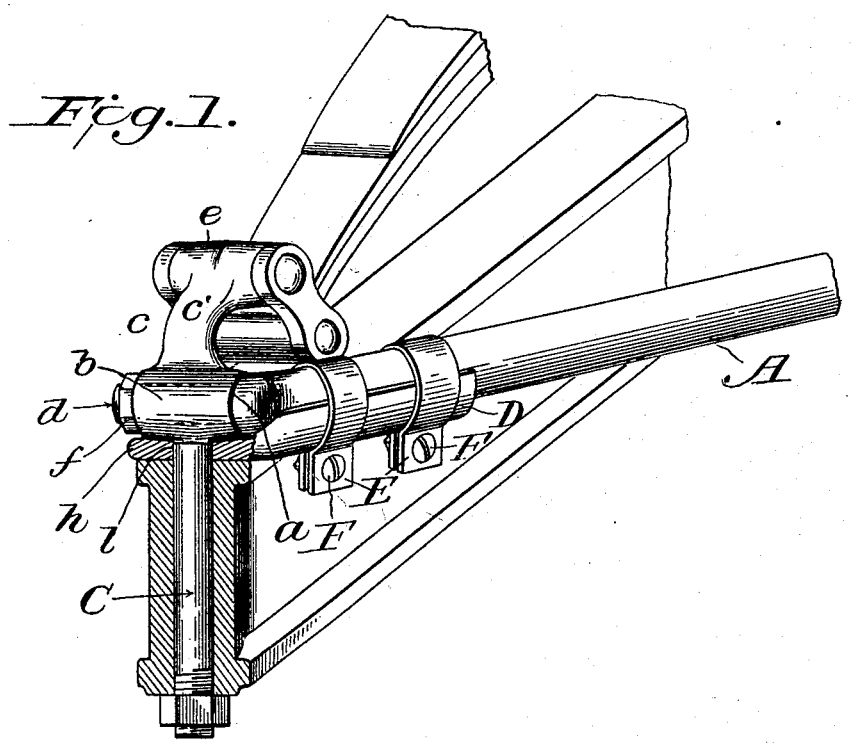
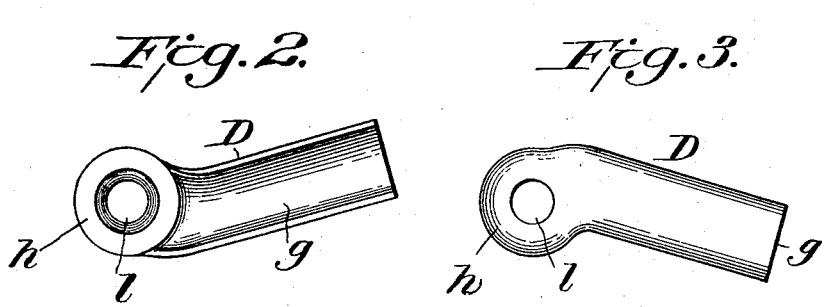
Inventors
John G. Carbaugh
Robert G. Hynicka
By T. Walter Fowler
Attorney

UNITED STATES PATENT OFFICE.

JOHN G. CARBAUGH AND ROBERT G. HYNICKA, OF LEBANON, PENNSYLVANIA.

RADIUS-ROD SUPPORTER.

1,199,528.  Specification of Letters Patent.  Patented Sept. 26, 1916.

Application filed January 3, 1916. Serial No. 69,840.

*To all whom it may concern:*

Be it known that we, JOHN G. CARBAUGH and ROBERT G. HYNICKA, citizens of the United States, residing at Lebanon, in the county of Lebanon and State of Pennsylvania, have invented certain new and useful Improvements in Radius-Rod Supporters, of which the following is a specification.

Our invention relates to a means for reinforcing and supporting the radius rod or like part of the running gear of a vehicle and to provide a device in the form of a clamp whereby a broken rod or the like may be temporarily repaired and operatively supported in its relation to other and associated parts.

With the above and other desirable objects in view, our invention consists of a plate or bar adapted to be clamped to the main portion of a radius rod, or the like, and to extend across the part thereof which usually breaks, or is broken, said plate having an eye or opening to admit the bolt of a shackle-bracket or hanger, and to form a seat for the hub of said shackle or hanger, as we will hereinafter describe and claim.

In the accompanying drawing forming part of this specification and in which similar reference characters indicate like parts in the several views; Figure 1 represents a portion of a radius rod with its attached shackle-bracket or hanger and showing the application of our supporter to said rod. Fig. 2 is a top plan view of the supporter. Fig. 3 is a bottom view of said supporter.

While the present invention is designed to meet a condition which is not infrequent in the use of motor vehicles, namely, where the usual radius rod breaks under the strains and stresses to which it is subjected, it will be manifest that the device which we are about to describe will be found of great assistance in reinforcing and supporting, and in repairing other broken rods, shafts or the like, thereby enabling an autoist who has had the misfortune to break such part to complete his journey with safety.

Primarily, our invention is designed as a supporter and reinforcement of the radius rods of the so-called "Ford" automobiles, but its use is not to be regarded as limited to this special field of service or to this particular type of vehicle.

For purposes of illustration we show a portion of a radius rod, A, such as is commonly used on "Ford" cars and it will be assumed that the end of this rod usually breaks, or in fact, has broken at the shoulder, *a*, and that the broken part is being supported and sustained by the device which forms the gist of the present invention. Ordinarily, in the type of cars mentioned, the hub-portion, *b*, of the usual shackle-bracket, or hanger, *c*, receives or is otherwise a part of the spindle or threaded rod, *d*, at the end of the radius rod and which shackle-bracket or hanger is made rigid or integral with a bolt, C, which in practice, passes through a suitable bearing on the axle of the machine to which axle the bolt is secured by a nut, not shown, engaging the threaded end of said bolt. The shackle or bracket also has its hub portion made integral or rigid with an upper extension, *c*, having an eye or bearing, *e*, for the bolt which secures the upper end of the usual swinging link whose lower end is suitably connected to the leaf spring of the vehicle. Aside from the shackle or bracket itself the parts just described are not fully shown as they form no part of our invention and are well known and commonly used on the cars mentioned. The shackle-bracket has its hub-portion mounted on the spindle end of the radius rod and is confined therein and against the shoulder, *a*, of said rod, by a nut, *f*, on the threaded end of the spindle.

To hold the foregoing parts in proper place in the event of the radius rod breaking at or near the aforesaid shoulder, *a;* that is, to hold up and support the broken section of the rod from below and to hold the shackle-bracket or hanger against the aforesaid shoulder, and also to hold the broken section of the radius rod transversely against but longitudinally in line with the main portion of said rod, we employ a plate, D, which we prefer shall have the form substantially as shown in Figs. 2 and 3, said plate having such length that it will bridge the break in the radius rod and extend a substantial distance along the rod, so that it may receive the split or other compressible bands, or clamps, E, which extend around the plate and radius rod and have their free ends connected by screws or bolts, F, whereby the bands may be suitably tightened to secure the plate in position.

The upper face of the plate, D, may be concaved, as at $g$, to enable it to form a better seat for the curved surface of the rod and to assist in holding the plate against transverse displacement.

At one end, say the outer end, the plate, D, is slightly deflected transversely and widened to form a head, $h$, of, preferably, more or less circular form and which also may be dished or provided with a flattened seat for the under side of the hub, $b$, of the shackle-bracket, $c$, before mentioned, the central portion of this head having an opening, $l$, to enable it to be slipped over the bolt, C, and to be brought up tightly under said hub and under the portion of the radius rod which usually breaks or has broken, when it is tightly secured in place by the aforesaid clamps or bands, E, or by other suitable means.

By providing the plate, D, with the opening for the bolt, C, the broken ends of a radius rod may be brought substantially together in line and the end of the hub, $b$, held against the shoulder, $a$, of said rod, and when so assembled and the plate, D, secured to the main part of the radius rod, said parts, including the broken section of the rod, will be so securely held together that a safe and satisfactory repair can be made and the driver of the vehicle may complete his journey without danger from the broken radius rod.

The invention described is simple and the device costs but little to make and will be found a useful addition to the kit of the automobilist, and as a reinforcement to radius rods, and the like when first assembled.

Having thus described our invention what we claim as new and desire to secure by Letters Patent is:—

1. The combination with a rod and a member mounted thereon and having a bolt extending at right-angles to said rod, of a reinforcement and support for said rod, said reinforcement being fixed to said rod and extending under the same and said member and having an opening transversely through it to admit the bolt of the latter.

2. The combination with a radius rod having a spindle and a hanger or bracket having a hub-portion mounted on said spindle and provided with a projecting bolt portion, of a reinforcing member extending under the hub-portion of said hanger and under a portion of said radius rod, said member having an opening to receive the bolt portion of said hanger, and means for securing said reinforcing member to said radius rod.

3. A supporter for a radius rod or the like, said supporter consisting of a plate curved in cross-section and adapted to lie parallel with and beneath said rod, said plate having a dished end portion deflected in one direction and having a flattened seat with an aperture to admit a part which extends substantially at right angles to said radius rod, the aperture in said deflected portion of the plate being in a plane at one side of the major axis of said plate.

In testimony whereof we affix our signatures in presence of two witnesses.

JOHN G. CARBAUGH.
ROBERT G. HYNICKA.

Witnesses:
D. W. HAIN,
A. L. LESSLEY.

Copies of this patent may be obtained for five cents each, by addressing the "Commissioner of Patents, Washington, D. C."